(12) United States Patent
Matveev et al.

(10) Patent No.: US 8,044,879 B2
(45) Date of Patent: Oct. 25, 2011

(54) TWO-PANEL LIQUID CRYSTAL SYSTEM WITH CIRCULAR POLARIZATION AND POLARIZER GLASSES SUITABLE FOR THREE DIMENSIONAL IMAGING

(75) Inventors: Alexander Matveev, Moscow (RU); Oleg Tishutin, Moscow (RU); Konstantin Kanashin, Moscow (RU); Alexander Zykov, Moscow (RU)

(73) Assignee: IZ3D LLC, San Diego, CA (US)

( * ) Notice: Subject to any disclaimer, the term of this patent is extended or adjusted under 35 U.S.C. 154(b) by 1146 days.

(21) Appl. No.: 11/483,982

(22) Filed: Jul. 11, 2006

(65) Prior Publication Data

US 2007/0035830 A1 Feb. 15, 2007

Related U.S. Application Data

(60) Provisional application No. 60/697,540, filed on Jul. 11, 2005, provisional application No. 60/741,079, filed on Dec. 1, 2005.

(51) Int. Cl.
*G09G 5/00* (2006.01)

(52) U.S. Cl. ................ 345/4; 348/42; 359/462

(58) Field of Classification Search ........... 345/4–6, 345/7, 87–89; 348/42–43, 46–60; 359/245–246, 359/251–256, 281, 298, 303, 462, 464–466
See application file for complete search history.

(56) References Cited

U.S. PATENT DOCUMENTS

| | | | | |
|---|---|---|---|---|
| 5,371,618 A | * | 12/1994 | Tai et al. | 349/78 |
| 5,629,798 A | | 5/1997 | Gaudreau | |
| 5,933,127 A | * | 8/1999 | DuBois | 345/87 |
| 5,965,874 A | * | 10/1999 | Aso et al. | 250/225 |
| 6,175,379 B1 | * | 1/2001 | Uomori et al. | 348/47 |
| 6,181,303 B1 | * | 1/2001 | Johnson et al. | 345/7 |
| 6,333,724 B1 | * | 12/2001 | Taira et al. | 345/5 |
| 6,590,605 B1 | * | 7/2003 | Eichenlaub | 348/51 |
| 6,717,728 B2 | * | 4/2004 | Putilin | 359/462 |
| 6,985,290 B2 | * | 1/2006 | Putilin et al. | 359/462 |
| 7,190,518 B1 | * | 3/2007 | Kleinberger et al. | 359/465 |
| 7,705,935 B2 | * | 4/2010 | Gaudreau | 349/96 |
| 2002/0113868 A1 | * | 8/2002 | Park | 348/51 |

FOREIGN PATENT DOCUMENTS

| | | |
|---|---|---|
| WO | WO 98/25414 A | 5/1998 |
| WO | WO 2006/038819 A1 | 4/2006 |
| WO | WO 2006/099074 A2 | 9/2006 |

OTHER PUBLICATIONS

International Search Report dated Feb. 13, 2007 for International Patent Application No. PCT/US2006/026706.

* cited by examiner

*Primary Examiner* — Jason Mandeville
(74) *Attorney, Agent, or Firm* — Hogan Lovells US LLP

(57) ABSTRACT

Disclosed herein are systems and methods for three dimensional display that produce stereo images (left and right eye images) each having particular known polarization so that they can be segregated and viewed with suitable polarizer eyeglasses to create the perception in the human mind of a three-dimensional image. According to one or more embodiments, two liquid crystal panels are utilized with the two panels being stacked one in front of the other relative to a light source and two polarizers are used surrounding the panel closest to the light source. In alternative embodiments, that panel and polarizers comprise a typical liquid crystal display ("LCD") monitor. In preferred embodiments, images produced by the system are then circularly polarized for decoding by eyeglasses having corresponding circularly polarized lenses.

24 Claims, 4 Drawing Sheets

TWO-PANEL LIQUID CRYSTAL SYSTEM WITH CIRCULAR POLARIZATION AND POLARIZER GLASSES SUITABLE FOR THREE DIMENSIONAL IMAGING

CROSS-REFERENCE TO RELATED APPLICATIONS

This application claims the benefit of the filing dates of prior U.S. Provisional Patent Applications Ser. Nos. 60/697,540, filed Jul. 11, 2005, and 60/741,079, filed Dec. 1, 2005.

FIELD OF THE INVENTION

This invention relates generally to three-dimensional imaging. More specifically, the present invention relates to three-dimensional imaging using a dual-layered liquid crystal arrangement combined with polarizer eyeglasses.

BACKGROUND OF THE INVENTION

Objects are seen in three dimensions because light reflects from them and generates a light field in space. The two eyes of a viewer perceive this light field differently due to their different locations in space relative to the object, and the brain of the viewer processes the different perceptions of the light field by the two eyes to generate three-dimensional ("3-D") perception.

Stereoscopic imaging is a technique utilized to simulate three-dimensional images to viewers. Stereoscopic displays operate by providing different yet corresponding perspective images of the same object or scene to the left and right eyes of the viewer. The viewer's mind thereby processes these two images to produce a perception of three dimensions. The principles of stereoscopic imaging have been applied to various areas for many years, including to the training of professionals, such as pilots to physicians, and to entertainment, such as 3-D movies and computer games.

All stereoscopic systems rely upon one or more techniques to segregate images for the right and left eyes. Typically, stereoscopic imaging systems utilize special parallax barrier screens, headgear, or eye wear to insure that the left eye sees only the left eye perspective and the right eye sees only the right eye perspective. These systems may include, for example, shutters on eye glasses that open or close depending on whether the image on the screen needs to be viewed by the left or right eye. However, these types of systems result in eyestrain associated with the "flicker" created by the shutter.

Additionally, U.S. Pat. No. 6,717,728, issued to Putilin et al. and commonly owned by the assignee of the present invention, discloses an autostereoscopic 3-D display that provides real-time and high resolution 3-D imaging capability without utilizing parallax barriers or specialized headgear. The Putilin et al. display utilizes an image processing algorithm to generate two or more calculated images from base stereopair images, which are the images that one ultimately wants to deliver to the two eyes of the viewer. A first one of those calculated images are sent to a distant display and the other one or more calculated images are sent to one or more transmissive displays placed in front (relative to the viewer position) of the distant display. Each display therefore simultaneously displays the calculated images that each contain at least some of the image information destined for each eye of a viewer. Each display's calculated image, when viewed simultaneously by a viewer, acts as a mask for and combines with the other displayed calculated images, resulting in the two different stereoscopic images being provided to the left and right eyes of the viewer, the stereoscopic effect being caused by the geometry of the spacing of the viewer's eyes and the spacing of the various layered displays. Putilin et al. discloses that the electronic processing to generate the calculated images necessary to deliver each of the base stereopair images to the appropriate eye can be accelerated by an artificial neural network. In one certain embodiments in the patent, multiple transmissive liquid crystal display panels are stacked one behind the other (relative to the viewer) in conjunction with a spatial mask, such as a diffuser, which is placed between liquid crystal displays to suppress Moiré patterns. While disclosing a highly effective imaging system, however, Putilin et al. describes a highly complex system that requires significant power. Thus, it may not be suitable for all purposes, including low cost applications where low-tech and flexible options are desirable.

As such, there remains a need in the art for improved three-dimensional imaging systems and methods that provide high resolution images simply and effectively to users.

SUMMARY OF THE INVENTION

It is an object of the present invention to provide three-dimensional imaging systems and methods that utilize liquid crystal technology and polarization technology to provide high resolution images.

Further, it is an object of the present invention to provide three-dimensional imaging systems and methods that can be readily adapted for use with standard computing systems and polarization glasses.

Additionally, it is an object of the present invention to provide three-dimensional imaging systems and methods that operate without constraining the viewer with respect to range of movement.

It is also an object of the present invention to provide three-dimensional imaging systems and methods that can operate as an "add-on" to conventional computing displays and personal computers.

To achieve these and other objects, the present invention provides for a liquid crystal ("LC") panel display system that provides stereo images having particular known polarization that can be segregated and viewed with suitable polarizer eyeglasses to create the perception in the human mind of a three-dimensional image. The stereo images produced simultaneously by the LC panel system are preferably polarized in orthogonal fashion to permit segregation by eyeglasses having lens with orthogonally different polarization characteristics.

According to one or more embodiments, two LC panels are provided, with the two panels being stacked one in front of the other relative to a light source. According to these embodiments, the first, or back, LC panel is arranged closest to the light source and with a polarizer placed on its front and rear side in the manner of a typical liquid crystal display ("LCD"). This back LC panel arrangement is driven by an appropriate control system, such as software running on a computer processor and control board, to generate a composite image that is a derivative of two stereopair images that need to be viewed separately by the left and right eye of the viewer in order to create the perception of a three-dimensional image. The stereopair images may, for example, be from a database of stereo images, be received from a feed from two camera sources, be the result of computer rendering or simulation programs, or the like. The light emitted by the back panel and the polarizers is polarized thus emerges from this trio at a certain, known angle. This light is then thereafter rotated, on a pixel by pixel basis, to a desired polarization by the second LC panel. The viewer thus wears polarized glasses that transmit light polarized at different angles to the left and right eye, preferably with the lens for each eye having an orthogonal polarization angle relative to the other to achieve best image separation. By controlling the angle of polarization of light exiting the front LC panel in accord with the known polarization characteristics of the eyeglasses, the present invention is able to control the intensity of light directed to each eye and hence the image perceived by each eye. Using an appropriate algorithm according to the present invention to calculate the angle of polarization, one of a stereopair images are delivered to each eye to create the perception of three dimensional images.

According to other embodiments, the two LC panels provided are stacked one in front of the other relative to the light source, however, the light emitted by the back panel passes through a diffuser and then a polarizer before being directed toward the front LC panel at a certain, known angle. The light produced by the back panel is then rotated by the second LC panel, which is perceivable by a viewer wearing polarized glasses that transmit light polarized at different angles to the left and right eye as stereo images. The diffuser in such embodiments of the invention are particularly suitable in limiting Moiré effects sometimes associated with the super imposing of polarizing screens.

In the various embodiments of the invention, the rear LC panel and the polarizer screens in front of and in back of this panel can be a conventional LCD, such as a standard LCD computer monitor. In such embodiments, the front LC panel comprises a separate assembly that can be attached to the front of conventional LCD to convert that standard display into a three dimensional display when utilized with appropriate polarizer glasses as described herein.

In most preferred embodiments of the invention, the polarizer glasses and the front LC panel are treated so as to utilize circular polarization as opposed to linear polarization.

The various embodiments of the invention having been thus summarized, the various preferred embodiments of the invention will now be described with the aid of several drawings. Before describing several exemplary embodiments of the invention, it is to be understood that the invention is not limited to the details of construction set forth in the following description. The invention is capable of other embodiments and of being practiced or carried out in various ways.

According to one particular aspect of the present invention, a three-dimensional display system for providing stereo images to a user is provided. The display system comprises a pair of polarized glasses wearable by a user. The polarized glasses contain one lens for each of two eyes of the user, and each lens has a direction of polarization being orthogonal to the other said lens. The system further includes a light source, and a first and a second liquid crystal panel placed in stacked configuration between the light source and the user, with the first liquid crystal panel being placed closer to the light source. A first polarizer is placed between the light source and the first liquid crystal panel and adapted to impart linear polarization of a first orientation to light directed toward the first liquid crystal panel, and a second polarizer is placed between the first and second liquid crystal panels. The second polarizer has a polarization orientation orthogonal to the first polarizer. The system further includes electronic processing means for processing a composite image from a stereopair comprising a left input image and a right input image. This processing means is further adapted to calculate an angle of polarization for each pixel of the second liquid crystal panel. The system further includes panel control means for receiving signals from the processing means and controlling operation of the panels in accord with the signals. According to this aspect, the composite image represents an average color intensity for each pixel of the left and right input images, and the angle of polarization $\phi$ for each pixel of the second liquid crystal panel is calculated from the relationship $$\tan \phi = \text{Square root of } (L/R)$$

where L is the intensity of a corresponding pixel for the left input image and R is the intensity of a corresponding pixel for the right input image. The panel control means causes said polarizers and said liquid crystal panels to polarize light from the source and rotate the polarized light such that a left image corresponding to the left input image is decoded by a left lens of the polarizer glasses and a right image corresponding to the right input image is decoded by a right lens of the polarizer glasses.

According to another particular aspect of the present invention, a three-dimensional display system for providing stereo images to a user is provided. The display system comprises a pair of polarized glasses wearable by a user. The polarized glasses contain one lens for each of two eyes of the user, and each lens has a direction of polarization being orthogonal to the other said lens. The system includes a flat panel liquid crystal display monitor that is capable of producing color images via a plurality of individually controllable pixels, and a transmissive liquid crystal panel adapted to be fitted on top of the flat panel monitor such that it is placed in stacked configuration between the monitor and the user. Electronic processing means of the system processes a composite image from a stereopair comprising a left input image and a right input image. The processing means is further adapted to calculate an angle of polarization for each pixel of the second liquid crystal panel. The system also includes a flat panel monitor control means for receiving first signals from the processing means and controlling operation of the monitor in accord with the signals, and liquid crystal panel control means for receiving second signals from the processing means and controlling operation of the liquid crystal panel in accord with the signals. The composite image represents an average color intensity for each pixel of the left and right input images, and the angle of polarization $\phi$ for each pixel of the second liquid crystal panel can be calculated from the relationship $$\tan \phi = \text{Square root of } (L/R)$$

where L is the intensity of a corresponding pixel for the left input image and R is the intensity of a corresponding pixel for the right input image. The panel control means causes the liquid crystal panel to polarize image light from the monitor and rotate the polarized light such that a left image corresponding to the left input image is decoded by a left lens of the polarizer glasses and a right image corresponding to the right input image is decoded by a right lens of the polarizer glasses.

According to yet another particular aspect of the present invention, a method for producing a perceived three dimensional image is provided. The method includes providing a pair of polarized glasses to be worn by the user where the polarized glasses contain one lens for each of two eyes of the user and each lens having a direction of polarization being orthogonal to the other lens. a first and a second liquid crystal panel is arranged in stacked configuration between a light source and the user with the first liquid crystal panel being closer to the light source. Additionally, a first polarizer is placed between the light source and the first liquid crystal panel, where the first polarizer being adapted to impart linear polarization of a first orientation to light directed toward the first liquid crystal panel. A second polarizer is placed between the first and second liquid crystal panels, with the second polarizer having a polarization orientation orthogonal to the first polarizer. The method further includes determining a composite image from a stereopair comprising a left input image and a right input image. This composite image represents an average color intensity for each pixel of the left and right input images. The first liquid crystal panel is controlled to display the composite image. Further, the method includes calculating an angle of polarization for each pixel of the second liquid crystal panel, wherein the angle of polarization φ for each pixel of the second liquid crystal panel is calculated from the relationship $$\tan \phi = \text{Square root of } (L/R)$$

where L is the intensity of a corresponding pixel for the left input image and R is the intensity of a corresponding pixel for the right input image. The second liquid crystal display panel is thereby controlled to achieve the calculated angle of polarization for each of its pixels to produce a three dimensional image viewable by a user wearing the glasses.

DESCRIPTION OF THE PREFERRED EMBODIMENTS

Figure 1:
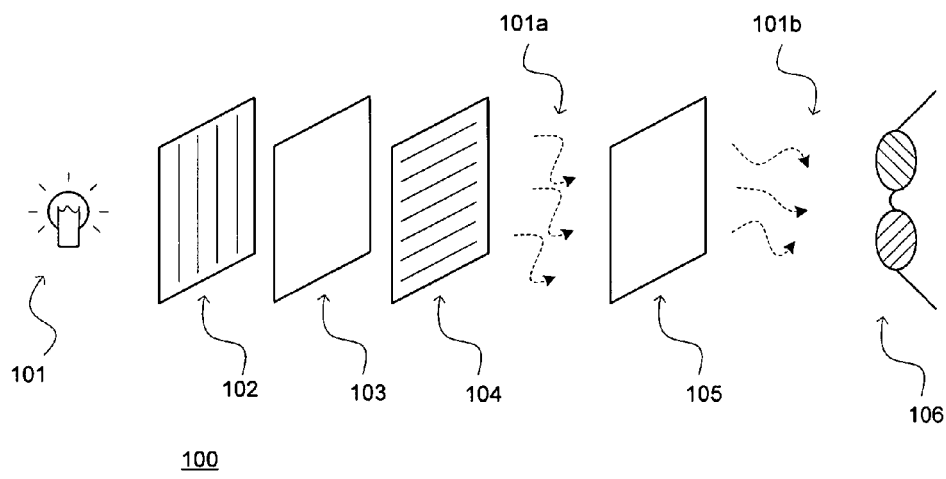
FIG. 1 is a schematic diagram depicting a three dimensional display system according to an embodiment of the invention.

Referring to the drawings and first to FIG. 1, one or more embodiments of the invention relate to the combination of a first polarizer 102 (or "back polarizer"), a back LC panel 103, a second polarizer 104 (or "front polarizer"), a front LC panel 105 and polarizing glasses 106. These elements, as depicted, are arranged in a stacked configuration. The first polarizer 102 is situated immediately in front of a suitable light source 101 such that light will be transmitted through the first polarizer 102, then through the back LC panel 103 (where its polarization can be changed as described below), then through the second polarizer 104. As will be readily appreciated by one skilled in the art, the polarization rotation imparted by the individual pixels of the back LC panel 103 cooperate with the second polarizer 104 to produce polarized light 101a having an intensity profile representative of an image that depends upon how the individual pixels of back LC panel 103 are controlled. The polarized light 101a emerges from the second polarizer 104 as depicted having a linear polarization orientation direction corresponding to the polarization direction dictated by the second polarizer 104. This polarized light 101a is then directed into the front LC panel 105 where the polarization of each pixel can be individually changed to produce light 101b that can be segregated by polarized glasses 106 to create stereo pair images viewable by a viewer, thus producing appropriate images for the left and right eyes sufficient for the viewer to perceive in three dimensions. The algorithms employed in the various embodiments of the present invention to control the back LC panel 103 and front LC panel 105 will be described in further detail below.

Figure 2A:
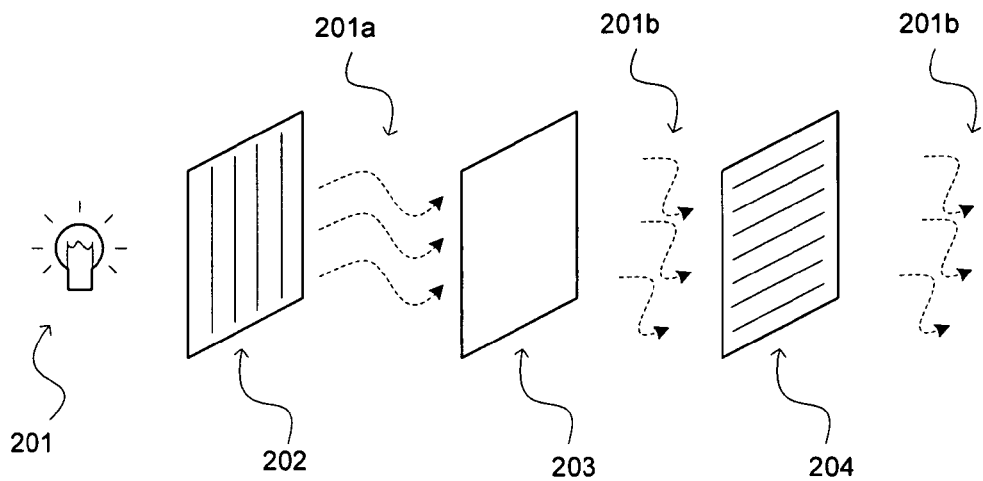
FIG. 2a and FIG. 2b are schematic diagrams illustrating the operation of liquid crystal displays as utilized in various embodiments of the invention.
Figure 2B:
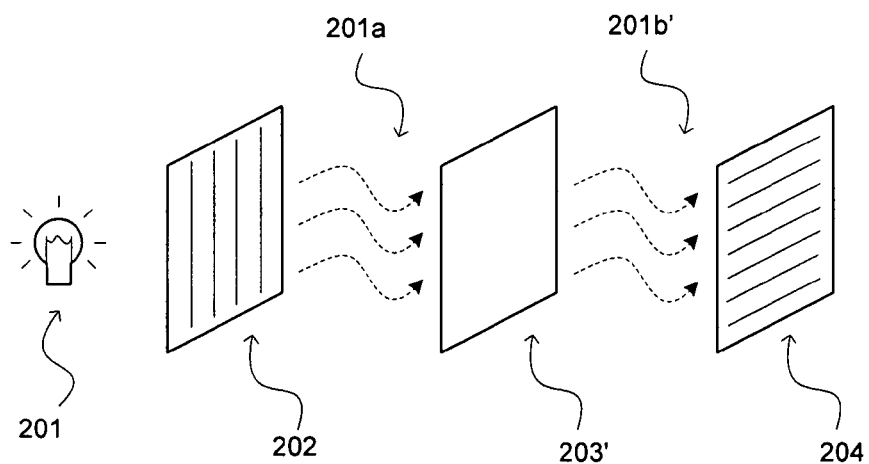

FIG. 2a and FIG. 2b collectively illustrate the basic working of a common LCD panel (such as the one created by the combined stacking of the first polarizer 102, the back LC panel 103, and the second polarizer 104 in FIG. 1). FIG. 2a depicts the operation of a LCD 200 before an electric field is applied where the various molecules in the liquid crystal material contained in the various pixels of a LC panel 203 are in a relaxed state. In conventional construction, a series of parallel ridges are formed in the two clear sheets that form the surfaces encasing the LC material. These ridges encourage the elongated molecules of the LC material to align roughly parallel to the ridges. The ridges in each of the opposing surfaces of a given LC panel, however, are formed perpendicular in direction to one another. Between the two sheets, however, the characteristics of the LC material are such that the molecules align with the ridges near each surface, but also twist naturally between the two perpendicular extremes through the interior of the panel. The LC material also has the property of tending to twist the polarization of light naturally as it passes through the material. Thus, as depicted in FIG. 2a, in conventional operation of a LCD 200 light from source 201 is polarized by a first polarizer sheet 202 to form polarized light 201a. This light 201a enters LC panel 203 in an orientation such that polarized light 201a is polarized in alignment with the ridges formed in the back surface of LC panel 203. Through the properties of the LC material, the light is then rotated as it passes through the LC material by the smooth twisting of the LC molecules such that it emerges having its polarization changed by 90° as changed orthogonally polarized light 201b. This changed polarized light 201 is then able to pass smoothly through the second polarizer sheet 204 as depicted. In such situations as depicted in FIG. 2a, a maximum intensity of light is emitted out of the LCD 200.

Conversely, FIG. 2b depicts the operation of a LCD 200 when an electric field is applied to the LC panel 203'. This causes the various molecules in the liquid crystal material contained in the various pixels of the LC panel 203' to be in an excited state whereby the molecules in the liquid align themselves with the field. Rotation of the polarized light 201a thus can be rotated variably depending upon the direction of the field. Thus, in the case depicted in FIG. 2b, as the light 201b' (which is not rotated at all with respect to light 201a) hits the polarizer sheet 204, nearly all the light 201b' is absorbed and the cell appears dark (contrary to the relaxed state of FIG. 2a where the whole assembly appears nearly transparent to the eye making the cell appear bright). Between the two extremes represented by FIG. 2a and FIG. 2b, the transmissivity of the cells can be varied in increments to produce a grayscale effect.

One of ordinary skill in the art will appreciate that the liquid crystal material used in standard LCD cells rotate all visible wavelengths nearly equally, thus additional elements are utilized in conventional LCDs (such as standard LCD computer monitors) to produce a color display. One common manner of providing a color LCD is to have each pixel divided into three sub-pixel cells, one with a red filter, one with a green filter and the other with a blue filter. The pixel can be made to appear an arbitrary color by varying the relative brightness of its three colored cells. These color component cells can be arranged in different ways, forming a kind of pixel geometry optimized for the monitor's usage.

In the embodiments of the present invention, the combination of polarizer 102, back LC panel 103, and polarizer 104, are used to generate a calculated image that is a derivative or composite of the known stereopair images that ultimately need to be conveyed to the two eyes of the viewer to produce the desired three-dimensional image effect. Source image information can be, for example, derived from a database of stereopairs stored in a memory unit, or from other suitable sources of base images. A memory unit provides a desired stereopair to a processor, which in turn processes the calculated images that emerge.

To produce the calculated image for the rear liquid crystal cell layer, the processor estimates the image intensity and color to be directed to each one of a viewer's eyes, represented by L (left eye image intensity) and R (right eye image intensity). The calculation of the intensity and color of each pixel of the back LC panel, D, may be represented by the following equation:

$$D=(L+R)/2$$

Where D is calculated for each component color (e.g., red, green, blue) of each pixel.

The algorithms utilized in embodiments of the present invention dictate screen imaging adjustments on the rear LC panel (or LCD monitor) and the front LC panel, and such algorithms can be utilized by, for example, a computing device (such as a personal computer, a video controller, or other suitable digital processing device) in order to calculate the intensity of each color in every pixel of each LC panel so that stereopair images are generated.

Figure 3:
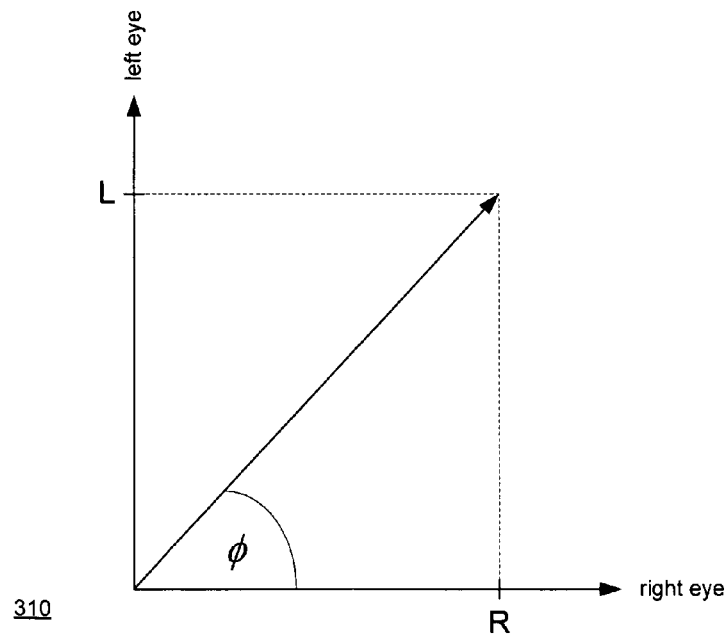
FIG. 3 is a graph illustrating how the angle of polarization is calculated relative to left and right eye image intensity according to various embodiments of the present invention.

Referring again to FIG. 1, after the light 101a emerges from front polarizer 104, it then passes through the front LC panel 105. The front LC panel rotates light at an appropriate angle ($\phi$) as dictated by the angle so that a viewer wearing polarizing glasses 106 sees an appropriate one of the stereopair images each in the appropriate one of his or her eyes, creating the perception of a three dimensional image. As already noted, the viewer's left and right eyeglasses are polarized at right angles (or "orthogonally" to one another) so that when the left eye lens transmits the maximum amount of polarized light, the right eye lens would transmit a minimal amount of that polarized light, and vice versa. This allows maximum separation of the images seen by the left and right eye respectively. Referring to FIG. 3, the calculation of the angle of rotation of $\phi$ as depicted in graph 310 of FIG. 3, may be accomplished when one considers the color and intensity of each pixel that needs to be viewed by the left (L) and right (R) eye in order to generate a stereopair image according to the following formulas:

$$R=I\cos^2\phi$$

$$L=I\sin^2\phi$$

where I is total the intensity of a given pixel. Since R and L are known quantities that can be readily determined from the stereopair images to be displayed, $\phi$ may be determined using the following formula.

$$\tan\phi=\text{Square root of }(L/R) \qquad \text{(formula 1)}$$

According to certain embodiments, the above calculation of $\phi$ is performed for each color in each pixel using a processor, such as a personal computer, a video controller, or other suitable digital processing device. This processor therefore continuously generates $\phi$ values for screens of image data, such that the composite image generated by the back LC panel 103 is separated into the stereopair images that are seen separately by the viewer in his or her left and right eye through polarized glasses 106. A three-dimensional effect is thereby generated.

The three-dimensional images created by the certain embodiments of the present invention have unlimited depth and 180 degree viewing angle. Therefore the invention provides for a multi-user display capability. Both three-dimensional and two-dimensional imaging for each viewer can be provided. Further, the final three-dimensional image suffers from minimal loss in resolution since color in each pixel is rotated to produce a signal for both eyes.

Figure 4:
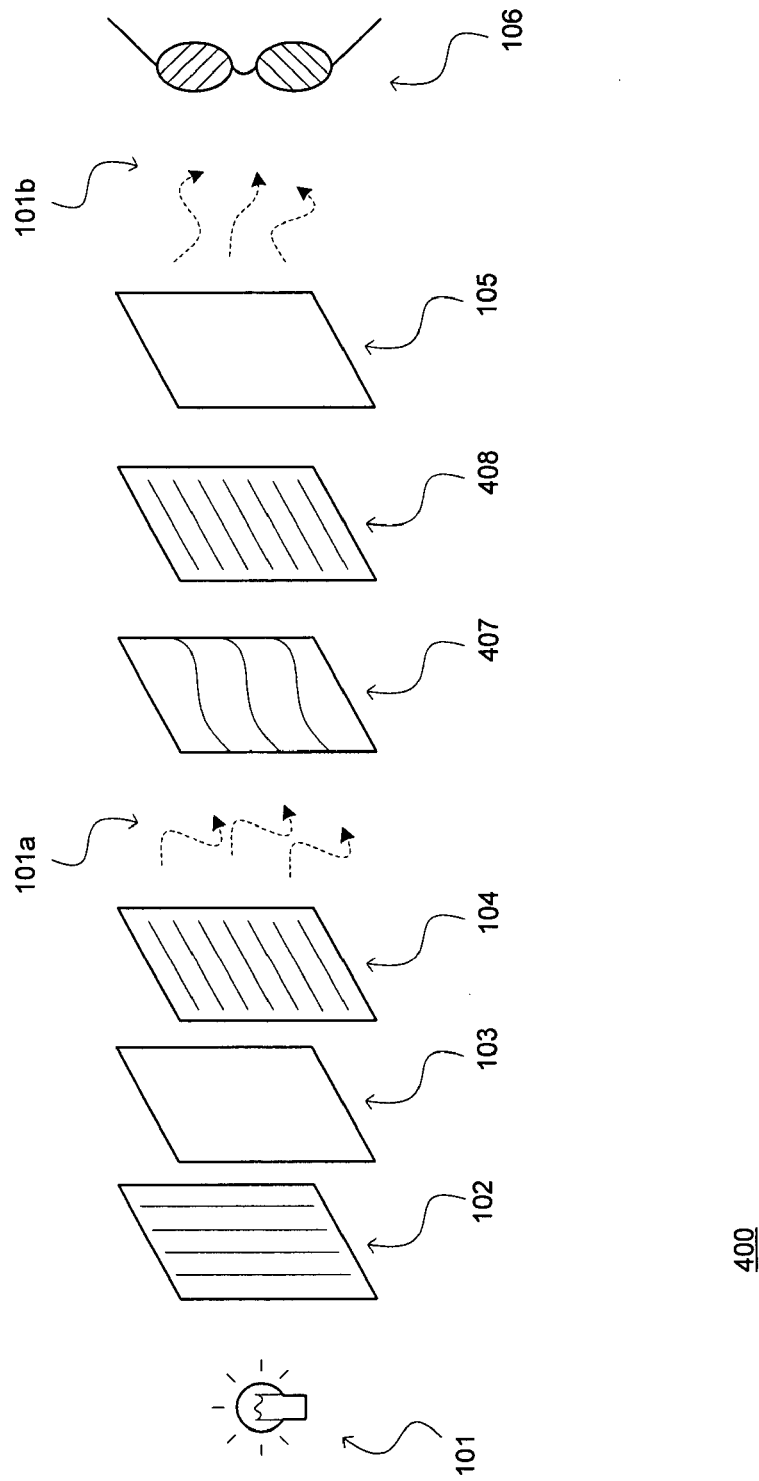
FIG. 4 is a schematic diagram depicting a three dimensional display system according to another embodiment of the invention.

According to certain preferred embodiments of the present invention as depicted in FIG. 4, a diffuser 407 and a polarizer 408 are provided between the front polarizer 403 and the front LC panel 405. These embodiments counter the Moiré effect that may be prevalent because of the superimposition of the polarizers in other embodiments. Understandably, such embodiments also approximate the situation where polarizers 402 and 404, together with light source 401 and back LC panel 403, form a convention LCD construct, such as a LCD computer monitor.

According to certain embodiments, the rear LC panel (103 or 403) and the two polarizers (102/402 and 104/404) in FIG. 1 or FIG. 4 is replaced with a standard LCD that, in conventional fashion, is adapted to control the intensity of light that emerges (rather than the angle of polarization directly). Understandably, such embodiments still, when used in combination with appropriate control algorithms, the front LC panel and the polarizer glasses, can enable a viewer to see an appropriate one of the stereopair images in each of his or her eyes, creating the perception of a three dimensional image. In these embodiments, the color intensity of each pixel (C) may be represented by the following equation:

$$C=\sin^2\phi$$

Therefore, once $\phi$ is calculated using the formula 1 above, the formula for C2 and C1, color and intensity emitted by the back and front panels, respectively, may be calculated as follows:

$$C2=R+L$$

$$C1=L/(L+R)$$

where L and R represent the color and intensity of light required to be directed to the left and right eye respectively in order to generate an appropriate one of a stereopair image for creating a three dimensional effect. L and R may be calculated using the formulas as described above.

As will be appreciated by one skilled in the art, LC display devices typically incorporate three "sub-pixels" into each pixel, with each sub-pixel independently controlling a color component for each pixel. The color components can add up to form a collective impression to the viewer that the pixel is transmitting white light or a variety of different colors. Typically, such display's sub-pixels are trios in the form of one of either red/green/blue sub-pixels or yellow/cyan/magenta sub-pixels. Due to the different wavelengths of each colored light component, however, LC displays can transmit and/or rotate each color component slightly differently. For many applications, this variation can be ignored. However, for high resolution imaging and 3-D imaging as described herein, such variation can be undesirable. Thus, in certain preferred embodiments of the invention, the color component sub-pixels of each pixel for the back and front LC panels take into account parameters to account for these varied light transmission properties so as to reduce errors in the perceived image.

In these certain embodiments, each sub-pixel could be calculated using an appropriate sub-pixel parameter, $\gamma$, such as according to the following formulas:

$$B = \left(\frac{L^\gamma + R^\gamma}{2}\right)^{\frac{1}{\gamma}}$$

$$F = \left(\frac{R^\gamma}{L^\gamma + R^\gamma}\right)^{\frac{1}{\gamma}}$$

In the above equations, γ is a different parameter for each color component/sub-pixel.

In another particularly preferred embodiment of the invention, the left and right images are not segregated according to ninety-degree, or orthogonal, planar polarization, but rather according to "clockwise" and "counterclockwise" circular polarization. Left-oriented and right-oriented (clockwise and anti-clockwise) circular polarization is therefore used as the independent vector basis instead of standard flat x-plane and y-plane polarization.

Figure 5:
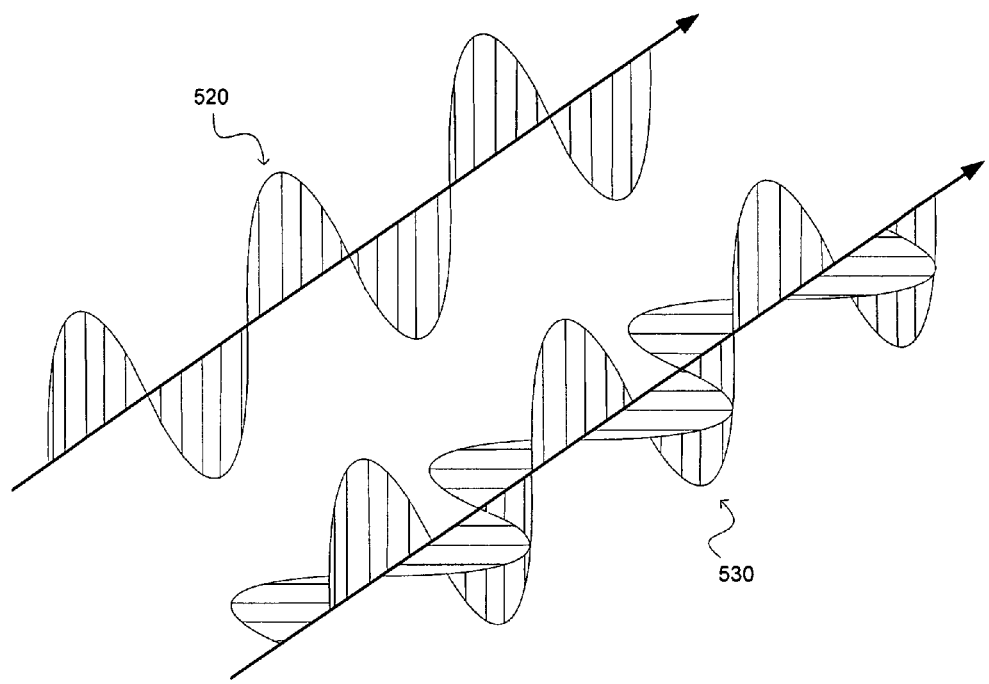
FIG. 5 and FIG. 6 are schematic diagrams depicting different types of polarization employed in various embodiments of the invention.

Light having a single planar wave orientation in space is said to be linearly polarized, as depicted in FIG. 5, where a y-polarized light wave 520 is depicted at the left. Light is a transverse electromagnetic wave, however, that occurs naturally in "incoherent" form wherein all possible planes of orientation are equally probable. If light is composed of two plane waves of equal amplitude which differ in phase by 90°, then that light is said to be circularly polarized. Circularly polarized light 530 is also depicted in the center of FIG. 5.

Figure 6:
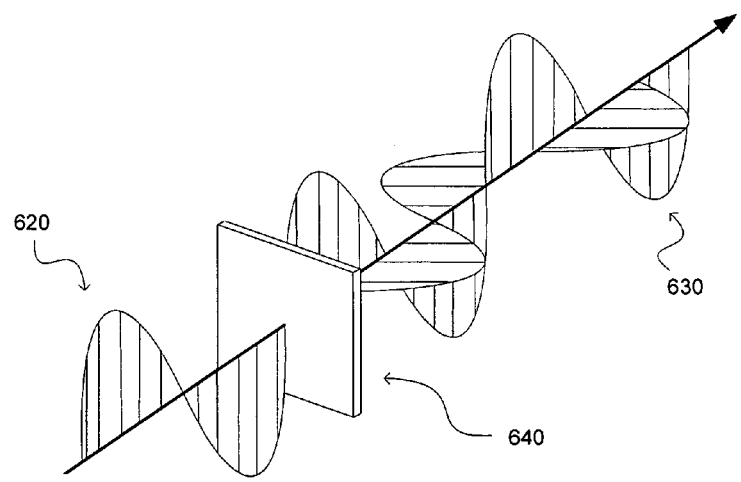

Circularly polarized light can be created by the use of a quarter wave retardation plate 640 (or quarter wave retardation film), as depicted in FIG. 6. When linearly polarized light 650 is directed incident on a quarter-wave retardation plate 640 at 45° to the optic axis, that light will be divided into two equal electric field components, with one of the components being retarded, or phase shifted, by a quarter wavelength by the plate. This produces circularly polarized light 660. Incident circularly polarized can be changed to linearly polarized light using a quarter wave retardation plate in the same manner.

A quarter wave retardation plate consists of a carefully adjusted thickness of a birefringent material such that the light associated with the larger index of refraction is retarded by 90° in phase (a quarter wavelength) with respect to that associated with the smaller index. The birefringent material is cut so that the optic axis is parallel to the front and back plates of the plate. Any linearly polarized light which strikes the plate will be divided into two components with different indices of refraction. When this is done by adjusting the plane of the incident light so that it makes 45° angle with the optic axis, equal amplitude o- and e-waves are produced. When the o-wave is slower, such as in the case of calcite, the o-wave will fall behind by 90° in phase, producing circularly polarized light.

In such preferred embodiments, the overall design and arrangement of the main system elements stays essentially the same as depicted and described above with respect to FIG. 1 or FIG. 4. The back LC panel 103 or 403 in such embodiments emits planar polarized light of a given intensity, then the polarization angle of light is turned as desired by the front LC panel 105 or 106. Finally, a quarter-wave retardation plate, arranged 45° to the angle of polarization of both panels and placed after the front LC panel, converts in-plane polarized light into the sum of two circular polarized beams, clockwise and counterclockwise. These circularly polarized beams will have different intensities according to the intensities of the incident linearly polarized beams.

Understandably, instead of polarized eye glasses with standard linearly polarized lenses (having orthogonal orientations), the wearer will require specialized circularly polarized eye glasses that decode clockwise circular polarization for one eye and counterclockwise circular polarization for the other eye. Each lens of the eye glasses will comprise a combination of a linear polarizer film and quarter-wave retardation film.

The operation of the polarized light in this embodiment of the invention can be expressed by the use of a Jones vector. A beam of light with amplitude A and phase ϕ of x-component and amplitude B and phase ψ of y-component can be described by the following vector.

$$J = \begin{bmatrix} Ae^{i\varphi} \\ Be^{i\psi} \end{bmatrix}$$

The effect of various optical devices on polarization of light can be described by different matrix transformations of this Jones vector. For example, the angle of rotation α of a polarization plane can be represented by the following.

$$R_\alpha = \begin{bmatrix} \cos\alpha & \sin\alpha \\ -\sin\alpha & \cos\alpha \end{bmatrix}$$

The quarter wave retardation film, which shifts the x-component's phase by ninety degrees, in turn can be represented according to the following.

$$D_x = \begin{bmatrix} e^{-i\frac{\pi}{2}} & 0 \\ 0 & 1 \end{bmatrix}$$

A polarizer film that which transmits only x-component light can be described according to the following matrix.

$$P_x = \begin{bmatrix} 1 & 0 \\ 0 & 0 \end{bmatrix}$$

Using these matrices, the light polarization changes in a monitor according to this embodiment of the invention can be described. The back LC panel, as described above, emits planar polarized light with amplitude A and can be represented by the following Jones vector.

$$J_B = \begin{bmatrix} A \\ 0 \end{bmatrix}$$

The polarization plane of the light beam described by $J_B$ and emitted by back LC panel is thereafter turned by angle ϕ by the front LC panel. This light is then converted by the quarter-wave retardation plate which is oriented at the angle α, giving the following Jones vector, $J_F$.

$$J_F = D_x R_\alpha R_\phi J_B$$

In this embodiment, the left eye sees the light through quarter-wave retardation film placed under angle β to the x-axis and then through the a polarizer placed at +45 degrees to the quarter wave film.

$$J_L = P_x R_{+45} D_x R_\beta J_F = P_x R_{+45} D_x R_\beta D_x R_\alpha R_\phi J_B$$

As for the right eye, it sees the light through quarter-wave retardation film placed under angle β to the x-axis and then through the a polarizer placed at −45 degrees to the quarter wave film, providing the following equation.

$$J_R = P_x R_{-45} D_x R_\beta J_F = P_x R_{-45} D_x R_\beta D_x R_\alpha R_\phi J_B$$

The final matrix product segregated for each eye can therefore be calculated to be the following.

$$J_L = \begin{bmatrix} A\sin(\varphi + \alpha - \frac{\pi}{4}) e^{i(\beta - \frac{\pi}{2})} \\ 0 \end{bmatrix}$$

$$J_R = \begin{bmatrix} A\sin(\varphi + \alpha + \frac{\pi}{4}) e^{i(\beta + \frac{\pi}{2})} \\ 0 \end{bmatrix}$$

If we set α equal to 0.25 π we get following result for the amplitude of light, $A_L$ and $A_R$, which gets to the left and right eyes, respectively.

$$A_L = A \sin \varphi$$

$$A_R = A \cos \varphi$$

The intensity of light is proportional to the square of its amplitude, therefore these equations can be rewritten in terms of the intensities, L and R.

$$L = B \sin^2 \varphi$$

$$R = B \cos^2 \varphi$$

From the above relationships, it can be concluded that if the quarter wave film is placed under 45° to the polarization plane of light that is emitted by the back panel the formulas for the front LC panel and the back LC panel as described above remain. However, when compared to embodiments that just utilize standard orthogonal planar polarization and standard polarized glasses, the use of circular polarization provides the significant advantage to the system that the user (i.e., wearer of the polarizer eye glasses) will not perceive a change in the 3-D effect when user tilts his head to the left or to the right.

While the above detailed description can be understood as being implemented preferably utilizing the control aspects of software, one of ordinary skill in the art will readily appreciate that the process steps and decisions may be alternatively performed by functionally equivalent circuits such as a digital signal processor circuit or an application specific integrated circuit (ASIC). Any process flows described above are not intended to describe the exact syntax of any particular programming language, and the flow diagrams illustrate the functional information one of ordinary skill in the art requires to fabricate circuits or to generate computer software to perform the processing required in accordance with the present invention. It should be noted that many routine programming elements, such as initialization of loops and variables and the use of temporary variables are not explicitly described as they are well within the skill of one of ordinary skill in the art. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

It is to be understood that certain embodiments of the invention may include certain applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system (e.g., within random access memory or RAM). It is also to be understood that other embodiments of the invention can provide the applications operating within the processor as the processes. While not shown in this example, those skilled in the art will understand that the computer system may include other processes and/or software and hardware subsystems, such as an operating system, which have been left out of this illustration for ease of description of the invention.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A three-dimensional display system for providing stereo images to a user, said display system comprising:
   a pair of polarized glasses wearable by said user, said polarized glasses containing one lens for each of two eyes of the user, each said lens having a direction of polarization being orthogonal to the other said lens;
   a light source;
   a first and a second liquid crystal panel placed in stacked configuration between said light source and said user with said first liquid crystal panel being closer to said light source;
   a first polarizer being placed between said light source and said first liquid crystal panel and adapted to impart linear polarization of a first orientation to light directed toward said first liquid crystal panel;
   a second polarizer being placed between said first and second liquid crystal panels and having a polarization orientation orthogonal to said first polarizer;
   electronic processing means for processing a composite image from a stereopair, said stereopair comprising a left input image and a right input image, said processing means being further adapted to calculate an angle of polarization for each pixel of said second liquid crystal panel; and
   panel control means for receiving signals from said processing means and controlling operation of said panels in accord with said signals;
   wherein said composite image represents an average color intensity for each pixel of the left and right input images, and said angle of polarization ϕ for each pixel of the second liquid crystal panel can be calculated from the relationship $$\tan\phi = \text{Square root of } (L/R)$$

where L is the intensity of a corresponding pixel for the left input image and R is the intensity of a corresponding pixel for the right input image, and wherein said panel control means causes said polarizers and said liquid crystal panels to polarize light from said source and rotate said polarized light such that a left image corresponding to said left input image is decoded by a left lens of said polarizer glasses and a right image corresponding to said right input image is decoded by a right lens of said polarizer glasses; and wherein said liquid crystal panels each comprise a plurality of pixels each having three sub-pixels corresponding to color components, and wherein said processing means utilizes an appropriate sub-pixel parameter γ to correct calculations relating to each color component according to the following formulas:

$$B = \left(\frac{L^\gamma + R^\gamma}{2}\right)^{\frac{1}{\gamma}}$$

$$F = \left(\frac{R^\gamma}{L^\gamma + R^\gamma}\right)^{\frac{1}{\gamma}}$$

wherein B is a color component intensity for a pixel of the first liquid crystal panel and F is a color component intensity for a pixel of the second liquid crystal panel and wherein γ is a different parameter for each color component/sub-pixel.

2. The three-dimensional display system as set forth in claim 1, wherein said first and second polarizers and said first liquid crystal panel comprise a flat panel liquid crystal display monitor, and wherein said second liquid crystal panel comprises a separate unit adapted to fit over said flat panel liquid crystal display monitor.

3. The three-dimensional display system as set forth in claim 1, wherein said system further includes located between said second liquid crystal panel and said user means for converting linearly polarized light to circularly polarized light.

4. The three-dimensional display system as set forth in claim 3, wherein said means for converting linearly polarized light to circularly polarized light comprises a quarter wave retardation plate.

5. The three-dimensional display system as set forth in claim 3, wherein said means for converting linearly polarized light to circularly polarized light comprises a quarter wave retardation film.

6. The three-dimensional display system as set forth in claim 3, wherein said lenses of said polarized glasses are adapted to decode circularly polarized light.

7. The three-dimensional display system as set forth in claim 1, wherein said processing means utilizes Jones vectors to calculate rotation of polarized light by each said liquid crystal panel.

8. The three-dimensional display system as set forth in claim 1, further comprising a diffuser and a third polarizer sheet being placed in stacked configuration between said second polarizer and said second liquid crystal panel, said diffuser being placed closest to said second polarizer and said third polarizer having a polarization orientation adapted to produce polarized light with an orientation corresponding to an input orientation required by said second liquid crystal panel.

9. A three-dimensional display system for providing stereo images to a user, said display system comprising:

a pair of polarized glasses wearable by said user, said polarized glasses containing one lens for each of two eyes of the user, each said lens having a direction of polarization being orthogonal to the other said lens;

a flat panel liquid crystal display monitor, said liquid crystal display monitor capable of producing color images via a plurality of individually controllable pixels;

a transmissive liquid crystal panel adapted to be fitted on top of said flat panel monitor such that it is placed in stacked configuration between said monitor and said user;

electronic processing means for processing a composite image from a stereopair, said stereopair comprising a left input image and a right input image, said processing means being further adapted to calculate an angle of polarization for each pixel of said second liquid crystal panel;

flat panel monitor control means for receiving first signals from said processing means and controlling operation of said monitor in accord with said signals; and liquid crystal panel control means for receiving second signals from said processing means and controlling operation of said liquid crystal panel in accord with said signals;

wherein said composite image represents an average color intensity for each pixel of the left and right input images, and said angle of polarization φ for each pixel of the second liquid crystal panel can be calculated from the relationship tanφ=Square root of (L/R)

where L is the intensity of a corresponding pixel for the left input image and R is the intensity of a corresponding pixel for the right input image, and wherein said panel control means causes said liquid crystal panel to polarize image light from said monitor and rotate said polarized light such that a left image corresponding to said left input image is decoded by a left lens of said polarizer glasses and a right image corresponding to said right input image is decoded by a right lens of said polarizer glasses; and wherein said liquid crystal panels each comprise a plurality of pixels each having three sub-pixels corresponding to color components, and wherein said processing means utilizes an appropriate sub-pixel parameter γ to correct calculations relating to each color component according to the following formulas:

$$B = \left(\frac{L^\gamma + R^\gamma}{2}\right)^{\frac{1}{\gamma}}$$

$$F = \left(\frac{R^\gamma}{L^\gamma + R^\gamma}\right)^{\frac{1}{\gamma}}$$

wherein B is a color component intensity for a pixel of the first liquid crystal panel and F is a color component intensity for a pixel of the second liquid crystal panel and wherein γ is a different parameter for each color component/sub-pixel.

10. The three-dimensional display system as set forth in claim 9, further comprising a polarizer sheet attached to said liquid crystal panel such that light from said monitor is linearly polarized with a known orientation before entering said liquid crystal panel.

11. The three-dimensional display system as set forth in claim 9, wherein said system further includes located between said liquid crystal panel and said user means for converting linearly polarized light to circularly polarized light.

12. The three-dimensional display system as set forth in claim 11, wherein said means for converting linearly polarized light to circularly polarized light and said liquid crystal panel comprise a unit adapted to fit over said monitor.

13. The three-dimensional display system as set forth in claim 11, wherein said means for converting linearly polarized light to circularly polarized light comprises a quarter wave retardation plate.

14. The three-dimensional display system as set forth in claim 11, wherein said means for converting linearly polarized light to circularly polarized light comprises a quarter wave retardation film.

15. The three-dimensional display system as set forth in claim 11, wherein said lenses of said polarized glasses are adapted to decode circularly polarized light.

16. The three-dimensional display system as set forth in claim 9, wherein said processing means utilizes Jones vectors to calculate rotation of polarized light by said monitor and said liquid crystal panel.

17. A method for producing a perceived three dimensional image, said method comprising:
providing a pair of polarized glasses to be worn by said user, said polarized glasses containing one lens for each of two eyes of the user, each said lens having a direction of polarization being orthogonal to the other said lens;
arranging a first and a second liquid crystal panel in stacked configuration between a light source and said user with said first liquid crystal panel being closer to said light source;
placing a first polarizer between said light source and said first liquid crystal panel, said first polarizer being adapted to impart linear polarization of a first orientation to light directed toward said first liquid crystal panel;
placing a second polarizer between said first and second liquid crystal panels, said second polarizer having a polarization orientation orthogonal to said first polarizer;
determining a composite image from a stereopair comprising a left input image and a right input image, said composite image representing an average color intensity for each pixel of the left and right input images;
controlling said first liquid crystal panel to display said composite image;
calculating an angle of polarization for each pixel of said second liquid crystal panel, wherein said angle of polarization φ for each pixel of the second liquid crystal panel is calculated from the relationship tanφ=Square root of (L/R)

where L is the intensity of a corresponding pixel for the left input image and R is the intensity of a corresponding pixel for the right input image; and
controlling said second liquid crystal display panel to achieve said calculated angle of polarization for each pixel of said second liquid crystal panel to produce a three dimensional image viewable by said user wearing said glasses; and wherein said liquid crystal panels each comprise a plurality of pixels each having three sub-pixels corresponding to color components, and wherein said processing means utilizes an appropriate sub-pixel parameter γ to correct calculations relating to each color component according to the following formulas:

$$B = \left(\frac{L^\gamma + R^\gamma}{2}\right)^{\frac{1}{\gamma}}$$

$$F = \left(\frac{R^\gamma}{L^\gamma + R^\gamma}\right)^{\frac{1}{\gamma}}$$

wherein B is a color component intensity for a pixel of the first liquid crystal panel and F is a color component intensity for a pixel of the second liquid crystal panel and wherein γ is a different parameter for each color component/sub-pixel.

18. The method as set forth in claim 17, wherein said first and second polarizers and said first liquid crystal panel comprise a flat panel liquid crystal display monitor, and wherein said second liquid crystal panel comprises a separate unit adapted to fit over said flat panel liquid crystal display monitor.

19. The method as set forth in claim 17, further comprising placing means for converting linearly polarized light to circularly polarized light between said second liquid crystal panel and said user.

20. The method as set forth in claim 19, wherein said means for converting linearly polarized light to circularly polarized light comprises a quarter wave retardation plate.

21. The method as set forth in claim 19, wherein said means for converting linearly polarized light to circularly polarized light comprises a quarter wave retardation film.

22. The method as set forth in claim 19, wherein said lenses of said polarized glasses are adapted to decode circularly polarized light.

23. The method as set forth in claim 17, wherein Jones vectors are utilized to calculate rotation of polarized light by each said liquid crystal panel.

24. The method as set forth in claim 17, further comprising placing a diffuser and a third polarizer in stacked configuration between said second polarizer and said second liquid crystal panel, said diffuser being placed closest to said second polarizer and said third polarizer having a polarization orientation adapted to produce polarized light with an orientation corresponding to an input orientation required by said second liquid crystal panel.

* * * * *